United States Patent [19]

Gonzalez

[11] Patent Number: 4,759,578
[45] Date of Patent: Jul. 26, 1988

[54] HAND-HELD ARTICLE CARRIER

[76] Inventor: Celestino Gonzalez, Rte. 1, Box 204, Caddo Mills, Tex. 75005

[21] Appl. No.: 49,316

[22] Filed: May 13, 1987

[51] Int. Cl.$^4$ ............................................. A61G 19/00
[52] U.S. Cl. ........................................ 294/15; 294/172
[58] Field of Search ................ 294/15, 169, 172, 141; 206/506; 211/132; 215/1 R

[56] References Cited

U.S. PATENT DOCUMENTS

| | | | |
|---|---|---|---|
| 369,215 | 8/1887 | Tanner | 294/15 |
| 2,399,527 | 4/1946 | Whitney | 294/15 |
| 2,739,007 | 3/1956 | Rauterberg | 294/15 |
| 4,153,285 | 5/1979 | Sparling | 294/15 |

FOREIGN PATENT DOCUMENTS 1546 of 1909 United Kingdom ................ 294/172

Primary Examiner—James B. Marbert
Attorney, Agent, or Firm—Richard C. Litman

[57] ABSTRACT

A hand-held load-carrying apparatus for use by one or two persons includes a length adjustable carrier frame mounting opposed, handle-equipped end assemblies. The apparatus is particularly advantageous for carrying relatively heavy objects up and down stairs or ramps, around corners in stairwells, and along spiral staircases. The ready adjustment of the pivotally mounted handles to a selected position assures that a user maintains the most comfortable upright posture that is physiologically preferred to support the spine in a position intended to minimize backstrain and other injury.

6 Claims, 2 Drawing Sheets

HAND-HELD ARTICLE CARRIER

BACKGROUND OF THE INVENTION

This invention relates to a hand-held apparatus adapted to facilitate the lifting and carrying of objects. The device itself is readily transportable, compact, and is primarily designed for use by one or two persons in carrying small but relatively heavy, boxed or bagged loads or objects of either regular or awkward shape. It is particularly suitable for objects having at least one planar side such as a box containing a microwave oven or a television receiver. The invention is especially useful when the load must be moved up or down stairs or ramps and in cases where the stairs have one or more corners or are part of a spiral staircase. For any bulky or awkwardly shaped object, a further advantage of the invention is that handles thereon provide a positive, more natural gripping means that are often not present on the object itself. If one worker alone is using the invention, the ability of the handles to pivot easily about the seat of the carrier allows immediate adjustment of the apparatus to a configuration that is both adaptable to a particular article size and is most comfortable to the user. If two workers are using the invention, each worker is able to grip one of the two handles with one or both hands. The ability of the handles of the invention to pivot easily about the seat to which they are attached is particularly advantageous to the worker on the higher level, whether this person is facing forwards or backwards. Because the handles of the carrier automatically adjust to appropriate angles to permit upright posture, which is the physiologically preferred orientation of the spine, the worker or workers will more likely avoid backstrains and other injuries particularly of the lower back that are commonly caused by lifting and carrying objects. In humans, the lower back is highly susceptible to such injuries, and many persons have a tendency toward this type of injury during lifting and carrying. This invention is specifically intended to reduce occurrence of back injuries produced by the lifting and carrying of heavy objects. A further advantage of the invention is its extendability in width, permitting its use for carrying loads of a plurality of widths corresponding to the various extensions of the invention.

DESCRIPTION OF THE PRIOR ART

The following U.S. patents are illustrative of the field of the present invention:

| Inventor | U.S. Pat. No. |
| --- | --- |
| W. R. Wisecarver | 3,648,909 |
| J. May | 3,400,828 |
| C. Davidson | 3,124,254 |
| J. A. Brown | 2,262,918 |
| J. G. Cofman | 705,383 |
| R. Ball | 286,372 |

The patent of Wisecarver (U.S. Pat. No. 3,648,909) discloses a carrying tray with foldable handles; however, this tray fails to foresee the functionality of the present invention in that it has two seating flanges that clamp the handles in vertical position, preventing their pivoting to more comfortable angles. The May patent (U.S. Pat. No. 3,400,828) discloses a rack for slender articles with rigid handles. The Davidson patent (U.S. Pat. No. 3,124,254) discloses a delivery tray for bakery goods; obviously, the bakery goods to be carried are very light in weight compared to the loads envisioned to be carried by the present invention. Also, the Davidson patent has foldable sides and a central bar handle for the special purposes for which it was designed in the bakery. The Brown patent (U.S Pat. No. 2,262,918) discloses a lifting device that resembles a conventional dolly without wheels. The Cofman patent (U.S Pat. No. 705,383) discloses a carrier with side rails integrally connected by cross-bars and with bails, on the ends of the side rails, adapted to swing to an inner or outer position relative to the frame. Although the Cofman carrier could conceivably function in a similar way to that of the present invention, its design is appreciably simpler and lacks the extendability feature allowing adaptation of the invention to loads of different sizes and shapes as well as carryability by either one or two persons. The Ball patent (U.S. Pat. No. 286,372) discloses a trunk carrier without folding handles.

SUMMARY OF THE INVENTION

An object of the invention is to provide an apparatus for carrying an article, the carrier apparatus having a seat or frame to support the object and handles attached to the frame with gripping members that can be hand-held by one or two workers. The handles are easily pivotable about and rods of the frame, adjusting immediately to positions maximizing the comfort of the workers and allowing them to work with upright postures, such postures being physiologically preferred to reduce the risk of backstrain and other injuries to the back or internal organs.

Another object of the invention is to provide extendability of the width of the frame of the carrier to accommodate object loads of a plurality of sizes. The invention consists of a framework composed of a plurality of telescoping straight preferably mild steel pipe members forming a frame that is held together by two end rods passing through holes near the ends of the pipe members, the end rods being at right angles to the pipe members, and the end rods being fastened with nuts engaging threads at the ends of the end rods. Two pivoting handles with a knuckle guard on each handle are connected rotatably to the end rods of the seat framework, each connection formed with a spacer between two pipe members at outer parts of the framework.

To utilize the invention, a heavy object is placed on the carrier frame. If a single person wishes to lift the object, the person pivots the two handles to an approximately vertical orientation, keeping both hands at about the same height for right-left levelness, and taking care during the lifting and carrying movements that the carrier seat or frame is constantly maintained level. Because the structural framework of the invention exhibits a limited degree of looseness, the seat is torsionable, and can be more easily used to carry an object around the corners of stairwells or around spiral staircases. The invention has no sidewalls because in ordinary usage, the friction offered by the frame is sufficient to hold the load on it as long as it is maintained approximately horizontally level.

When two persons are working together, the object is maintained on the frame, as the handles then pivot to the most comfortable angles determined by the relative height and arm length of the two persons, as well as by their path in ascending or descending stairs or ramps. In such situations, the load remains in position due to friction or it may be rested against a portion of the lower one of the two handles to prevent its sliding downwards in the direction of gravity. For example, a person holding one handle may walk backwards up stairs while helping to carry a 100-pound load. With the invention, the handles immediately adjust so that the person need not change posture.

The unit is also useful in cases where a dolly, which is designed to handle larger and heavier loads than those that are envisioned for the invention, is unsuitable, particularly on stairs. The invention can also be used to carry hospital patients in a sitting position. In this case, the frame portion of the invention could be covered with a soft, comfortable overlay; two orderlies would be required to provide the lifting and motive power. When not in use to carry loads, the invention folds up to a thickness of about 2", which is convenient for easy transit or storage.

DESCRIPTION OF PREFERRED EMBODIMENTS

Figure 1:
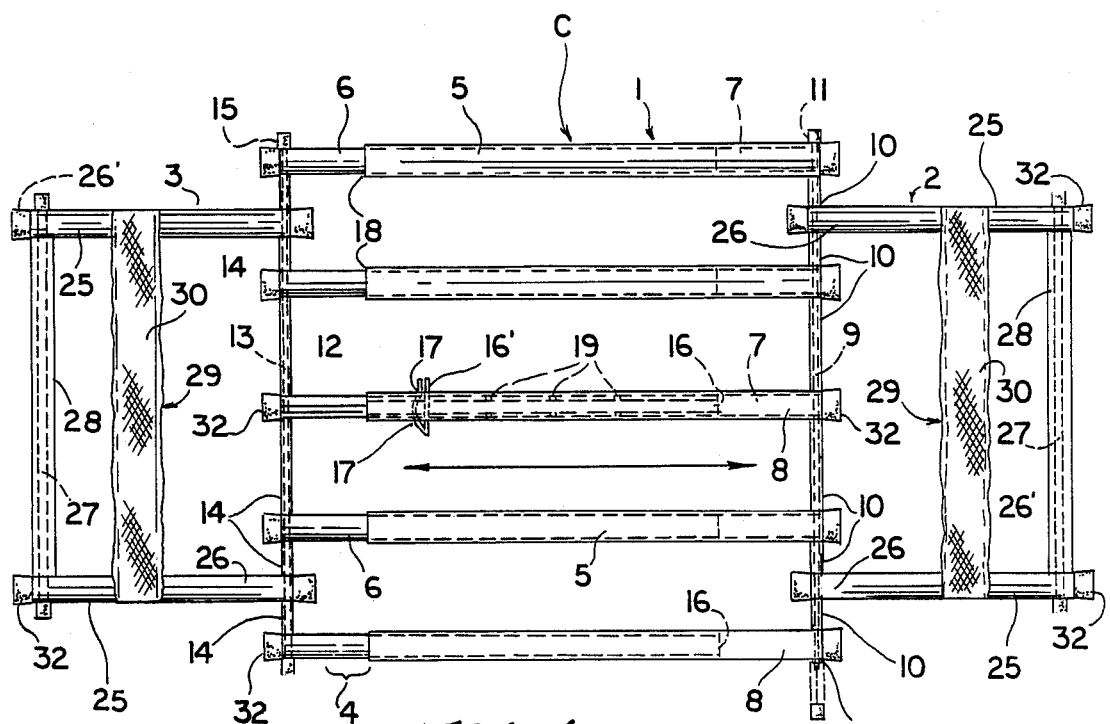
FIG. 1 is a top plan view of the invention in a ready to use position.

Referring now to the drawings, particularly FIG. 1, the present invention will be seen to relate to an article carrier generally designated C having a support frame or seat assembly 1 at the opposite ends of which are attached a pair of opposed end assemblies 2, 3. Seat assembly 1 comprises a plurality of parallel support members 4 each of which comprises a pair of axially adjustable support elements 5, 6. Preferably these support elements comprise first outer elements 5 in the nature of elongated tubular members within which are disposed cooperating second inner elements 6. The latter comprise smaller diameter tubular elements telescopically engaged within the interior 7 of the larger diameter outer elements 5. A fixed end 8 of each of the first outer elements 5 is pivotably mounted about a shaft 9 which shaft also carries a plurality of sleeves or spacers 10 maintaining the plurality of elongated first outer elements 5 in a substantially equally spaced apart manner as shown in the drawings. Suitable removable fasteners 11 on the ends of the shaft 9 permit ready assembly and/or disassembly of the above described components.

The fixed ends 12 of the second inner elements 6 are likewise pivotably mounted about a shaft 13 and maintained in an equally spaced apart manner by means of a plurality of spacers 14. Again, an appropriate removable fastener 15 on the ends of the shaft 13 allow assembly and disassembly of the above described components.

Figure 2:
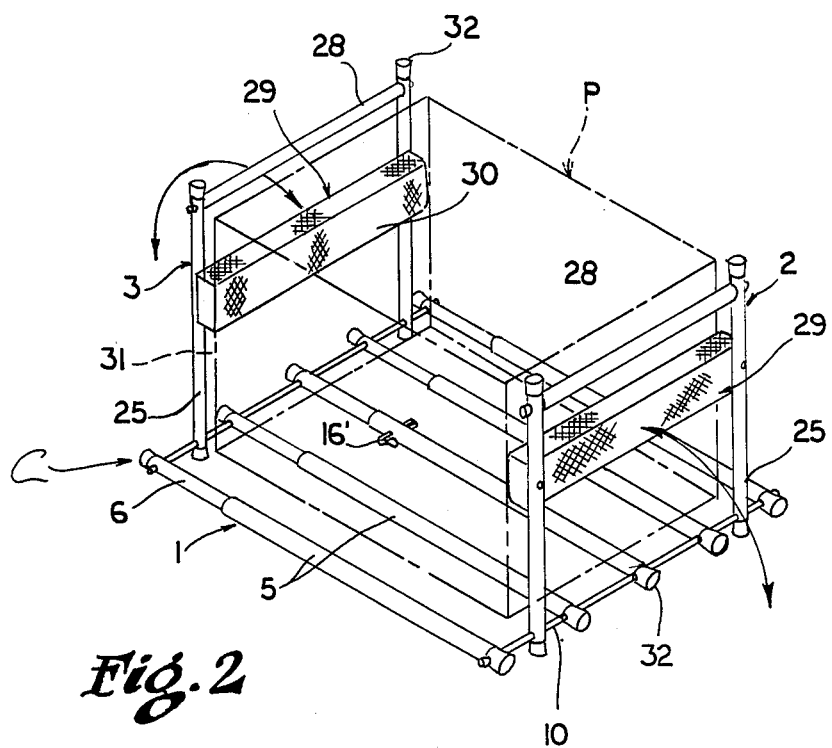
FIG. 2 is a front elevation as used by one person to lift a relative small container.
Figure 3:
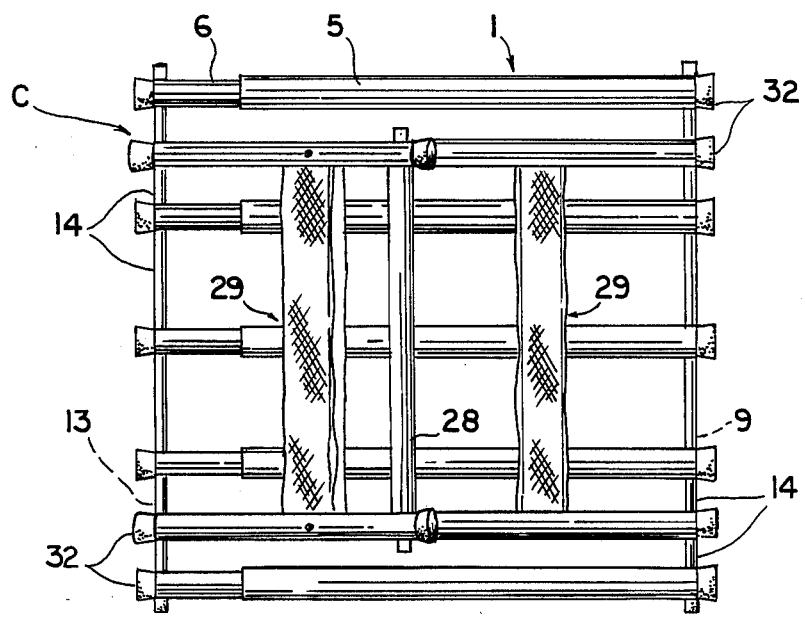
FIG. 3 is a plan view of the invention in a folded position for transit or storage.

As shown most clearly in FIGS. 1 and 2 of the drawings, the free ends 16 of the second inner elements 6 are slidably disposed in a telescopic manner within the interior 7 of the larger diameter outer elements 5 such that the longitudinal extent of the seat assembly 1 may be adjustably selected according to the major dimension of the package or article P intended to be carried by the device. Once this major dimension is selected, the relatively displaceable outer and inner elements 5, 6 are substantially fixed by means of at least one removable fastener 16' inserted transversely through diametrically opposed openings 17 adjacent the free end 18 of one or more of the first outer elements 5. As each said fastener 16' is passed through the opposed openings in the first outer element 5 it will be understood that the same fastener simultaneously engages a selected one of a plurality of longitudinally spaced openings 19 transversely disposed through the inner elements 6. By this arrangement it will be appreciated that merely by shifting one end assembly 2 relative to the other end assembly 3, the telescopic relationship between the two sets of cooperating elements 5 and 6 will be varied and when the desired length of the seat assembly 1 is achieved, at least one fastener 16' is used to interlock the outer elements 5 with respect to the inner elements 6 by means of the nearest applicable openings 19 in the inner elements. It is not necessary to provide a removable fastener 16' for every one of the pair of cooperating telescopic elements 5, 6. Preferably, one such fastener 16' is employed such as in the center-most outer and inner elements 5, 6 such as shown in FIGS. 1 and 2 of the drawings.

When it is desired to utilize the article carrier C of the present invention, one places the package or article P intended to be transported upon the adjusted seat assembly 1 between the two end assemblies 2, 3. These end assemblies provide the handle mechanisms by which a user is able to more comfortably and safely lift and transport an item disposed atop the seat assembly. Each end assembly will be seen to include a pair of side elements 25—25 each having a lower or pivot end 26 mounted upon the same shaft 9 or 13 supporting the respective elements 5 and 6. Joining the opposite outer or free ends 26' of the two pairs of side elements 25 is a tranverse shaft 27 about which is carried a tubular handle element 28 the latter of which is preferably free to rotate upon its supporting shaft 27 for reasons which will become obvious hereinafter. The pivot ends 26 of the end assembly side elements 25 are maintained in a proper lateral disposition by means of the aforedescribed spacers 10, 14 on the seat assembly shafts 9, 13 while the opposite ends of the side elements are maintained in a parallel spaced apart relationship by means of a relatively fixed, transverse knuckle guard 29, at least the inner surface of which is preferably provided with a protective layer such as the padding 30. The knuckle guards 29 are positioned adjacent the tubular handle elements 28 a sufficient distance to ensure unimpeded movement of a users hand about the tubular elements.

During use of the article carrier C, if a single user desires to transport a small or moderate-sized package, the device will be used as illustrated in FIG. 2 of the drawings wherein a package P is shown disposed atop the seat assembly 1. A single user would then grasp the two handle elements 28—28 thereby pivoting the end assemblies 2, 3 upwardly to a substantially vertical position whereafter during continued lifting, one's hand would be protected as the surfaces 30 of the two knuckle guards 29—29 will abut the end walls 31—31 of the package thus ensuring adequate clearance between the periphery of the handle elements 28 and the package end walls 31 to enable comfortable gripping by the user.

Figure 4:
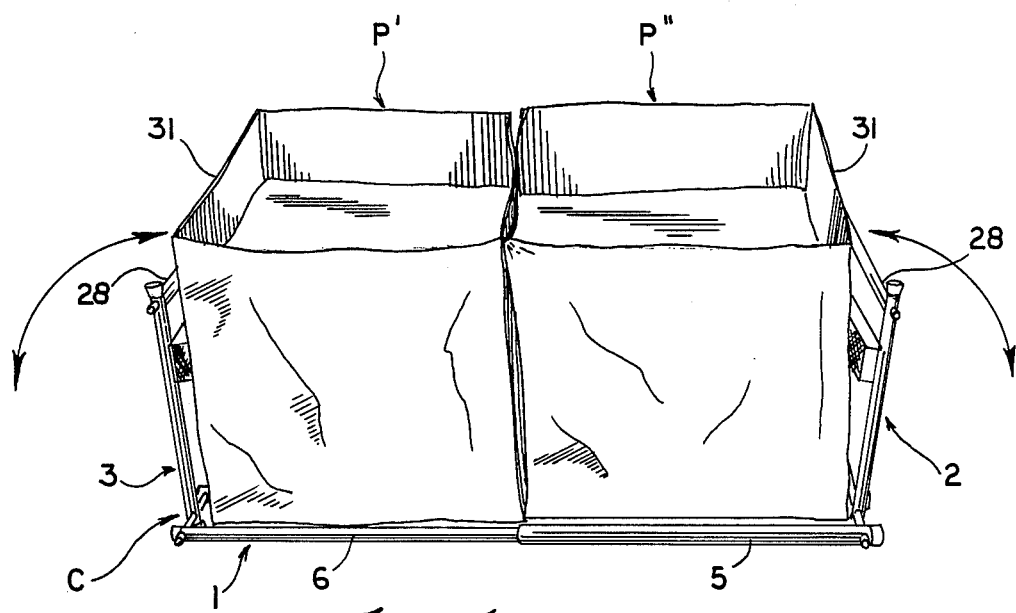
FIG. 4 is a view similar to FIG. 2 but with the frame seat adjusted for use with larger loads and/or by two persons.

Alternatively, when a larger and/or heavier package is desired to be transported, it will be understood that the longitudinal extent of the frame or seat assembly 1 may be increased by relocating the removable fastener 16' with respect to another cooperating opening 19 in the inner element 6 after which the article carrier will be sized in a manner as shown in FIG. 4 wherein either a plurality of packages P', P" or alternatively a single larger package (not shown) may be transported such as by two workers, one each grasping one of the end assembly handle elements 28.

The joints between the various pivoted elements of the present article carrier are preferably loose that is, close, minimal tolerances are avoided such that both the seat assembly 1 as well as the end assemblies 2, 3 are free to exhibit a limited degree of torsional displacement during use. This arrangement permits negotiating difficult terrain or irregularly constructed stairwells with greater ease in view of the slight twisting of the plane of the seat and end assemblies. This looseness is maintained between the various elements engaging the two pivot shafts 9, 13 due to the fixed distance defined between each pair of fasteners 11 or 15, which distance is selected to freely allow relative movement between these cooperating elements. Additionally, for the sake of preventing scratching of the surroundings or injury to users, the various ends of the plurality of tubular elements are preferably provided with a protective end cap 32.

What is claimed is:

1. An apparatus for carrying soft and hard articles comprising;
    a seat assembly including a plurality of laterally spaced apart, longitudinally extending support members each having opposite fixed ends, each said support member including a pair of telescopically engaged, rigid, elongated inner and outer tubular elements,
    said support member opposite ends respectively pivotally joined to a pair of transversely extending shafts, spacers on said shafts maintaining said support members in a substantially fixed lateral spacing,
    a pair of end assemblies each including a pair of substantially equi-length, elongated, rigid side elements each provided with an outer and a lower end, each said pair of side element lower ends respectively pivotally attached to one said transversely extending shaft in a substantially laterally spaced apart manner with said spacers maintaining said side element lower ends in a substantially fixed lateral spacing,
    a rigid, elongated handle transversely extending between each said end assembly pair of side element outer ends and providing therewith a transversely disposed substantially coplanar arrangement, a rigid knuckle guard joined to and spanning each said pair of side elements and projecting outwardly of the plane of said side elements and handle,
    said seat assembly telescopically engaged inner and outer elements longitudinally displaceable relative one another to allow alteration of the length of said seat assembly and correspondingly, the distance between said pair of end assemblies, and
    fastening means selectively engageable with at least one said pair of telescopically engaged inner and outer tubular elements to fixedly maintain a selected length of said seat assembly, whereby
    positive, captive engagement of a soft or hard article placed on said seat assembly is assured following alteration of the length of said support members to properly space said end assemblies apart and allow independent pivoting of said end assemblies relative said seat assembly.

2. An article carrier according to claim 1 wherein, said seat assembly support members and said end assembly side elements are joined to said shafts in a manner to provide sufficient clearance therebetween allowing a torsional displacement of said support members and side elements relative said shafts during manipulation of the article carrier.

3. An article carrier according to claim 1 wherein, said fastening means includes a plurality of transverse openings in said telescopically engaged elements of at least one said support member, and
    a removable fastener insertable through selected ones of said openings when aligned with one another.

4. An article carrier according to claim 1 wherein, said handle includes a shaft spanning said end assembly side elements and a tubular hand gripping element surrounding each said shaft.

5. An article carrier according to claim 1, wherein said spacers maintain said support members substantially laterally equidistant.

6. An article carrier according to claim 1 including, a cushion layer on said knuckle guards adapted to abut an article disposed upon said seat assembly as said end assemblies are manipulated to a substantially vertical position.

* * * * *